(12) United States Patent
Suzuki et al.

(10) Patent No.: US 7,767,339 B2
(45) Date of Patent: Aug. 3, 2010

(54) PRODUCTION METHOD OF NON-AQUEOUS ELECTROLYTE SECONDARY BATTERY

(75) Inventors: Kohei Suzuki, Yao (JP); Masao Fukunaga, Osaka (JP); Toshihide Murata, Izumiotsu (JP); Kazunori Kubota, Moriguchi (JP); Tsumoru Ohata, Kyoto (JP)

(73) Assignee: Panasonic Corporation, Osaka (JP)

( * ) Notice: Subject to any disclaimer, the term of this patent is extended or adjusted under 35 U.S.C. 154(b) by 1179 days.

(21) Appl. No.: 11/124,264

(22) Filed: May 9, 2005

(65) Prior Publication Data

US 2005/0198815 A1 Sep. 15, 2005

Related U.S. Application Data

(62) Division of application No. 10/231,144, filed on Aug. 30, 2002, now abandoned.

(30) Foreign Application Priority Data

Sep. 14, 2001 (JP) ............................. 2001-280360
Mar. 6, 2002 (JP) ............................. 2002-060277

(51) Int. Cl.
*H01M 4/48* (2010.01)
*H01M 4/62* (2010.01)
*H01M 6/14* (2010.01)
*H01M 10/058* (2010.01)

(52) U.S. Cl. ............... 429/217; 429/231.95; 429/231.8; 29/623.5

(58) Field of Classification Search ........................ None
See application file for complete search history.

(56) References Cited

U.S. PATENT DOCUMENTS 5,609,975 A * 3/1997 Hasegawa et al. ........... 429/217
5,807,645 A 9/1998 Takeuchi et al.

(Continued)

FOREIGN PATENT DOCUMENTS

EP 0 243 653 11/1987

(Continued)

OTHER PUBLICATIONS

European Search Report dated May 30, 2007.

(Continued)

*Primary Examiner*—Keith Walker
(74) *Attorney, Agent, or Firm*—McDermott Will & Emery LLP (57) ABSTRACT

A method for producing a non-aqueous electrolyte secondary battery comprising the steps of: (i) mixing a positive electrode active material, a first binder A and a dispersion medium to prepare a paste A, the active material comprising a lithium-containing transition metal oxide; (ii) mixing a conductive agent, a second binder B and a dispersion medium to prepare a paste B, the conductive agent comprising carbon black; (iii) mixing the paste A and the paste B to prepare a positive electrode material paste C; (iv) applying the positive electrode material paste C onto a positive electrode core member and rolling and drying the resultant member to prepare a positive electrode; and (v) fabricating a battery using the positive electrode, a negative electrode and a non-aqueous electrolyte, wherein contact angle $\theta_A$ between the non-aqueous electrolyte and the binder A and contact angle $\theta_B$ between the non-aqueous electrolyte and the binder B satisfy the formula (1): $\theta_B - \theta_A \geq 15°$.

8 Claims, 8 Drawing Sheets

U.S. PATENT DOCUMENTS 6,001,507 A * 12/1999 Ono et al. .................. 429/217
2003/0124422 A1 * 7/2003 Cintra et al. ................ 429/209

FOREIGN PATENT DOCUMENTS

| EP | 1 089 366 | 4/2001 |
| EP | 1 126 536 A2 | 8/2001 |
| EP | 1 146 586 A2 | 10/2001 |
| JP | 09-320576 | 12/1997 |
| JP | 11283628 A * | 10/1999 |
| JP | 2000-58039 A | 2/2000 |

OTHER PUBLICATIONS

European Search Report issued in corresponding European Patent Application No. 02020327.9—1227, dated Feb. 14, 2007.
United States Office Action issued in U.S. Appl. No. 12/010,343 dated Oct. 15, 2009.

* cited by examiner

PRODUCTION METHOD OF NON-AQUEOUS ELECTROLYTE SECONDARY BATTERY

RELATED APPLICATION

This application is a divisional of U.S. patent application Ser. No. 10/231,144, filed Aug. 30, 2002 now abandoned, which claims priority of Japanese Patent Applications JP2001-280360 and JP2002-060277, filed Sep. 14, 2001 and Mar. 6, 2002, respectively, and the contents of which are hereby incorporated by reference.

BACKGROUND OF THE INVENTION

With the rapidly growing trend toward cordless and more portable consumer electronic products, there is an increasing demand for batteries that are small and lightweight but have high energy density as the power source for such electronic products. From this viewpoint, non-aqueous electrolyte secondary batteries, particularly lithium ion secondary batteries, are commonly used in such appliances as notebook computers, mobile phones and audiovisual equipment as batteries having high voltage and high energy density.

Because of the use in such appliances, these non-aqueous electrolyte secondary batteries are required to have good discharge characteristics while maintaining high capacity. In order to satisfy the requirement, it is essential to improve permeability of an electrolyte into a positive electrode.

The permeability of the electrolyte into the positive electrode can be improved, for example, by a process of adding a proper amount of fluorocarbon resin having a good affinity for the electrolyte to a positive electrode material layer as a binder while ensuring sufficient porosity of the positive electrode material layer. The expression "porosity" as used herein refers to the volume ratio of pores of the positive electrode material layer.

Fluorocarbon resins conventionally used include polyvinylidene fluoride (hereinafter referred to as PVDF) and polytetrafluoroethylene (hereinafter referred to as PTFE). Among them, PVDF is versatile as the binder. One of the reasons for this is that PVDF, which has a high affinity for a non-aqueous electrolyte, facilitates permeation of the electrolyte into the positive electrode material layer.

For example, a fluorocarbon resin dissolved in a solvent such as N-methyl-2-pyrrolidone (hereinafter referred to as NMP) is added as the binder, together with carbon black such as acetylene black and Ketjen black serving as a conductive agent, to a lithium-containing transition metal oxide serving as a positive electrode active material, and the resultant mixture is kneaded to prepare a positive electrode material paste. The positive electrode material paste is applied onto a positive electrode core member such as an aluminum foil and dried, and the resultant member is rolled and cut into predetermined dimensions. This is how a positive electrode is conventionally produced.

The affinity between a solid and a liquid is generally evaluated by dropping the liquid on the surface of the solid and measuring the contact angle formed therebetween. When the affinity between the solid and the liquid is high, i.e., when there is a small difference in surface free energy between the two, the contact angle becomes small. For example, the contact angle between a PVDF film and a non-aqueous electrolyte having a common composition composed of a mixed solvent of ethylene carbonate and diethyl carbonate and $LiPF_6$ dissolved therein is as low as about 15°.

The above-described conventional method of positive electrode production, however, has a problem that the conductive agent tends to form agglomerated particles including the fluorocarbon resin. Although the cause of this problem is uncertain yet, the reason may be as follows. The conductive agent generally has a low affinity for polar solvents such as NMP, water and solvents to be used for non-aqueous electrolytes, and the fluorocarbon resin dissolved in such a polar solvent is therefore deposited in sequence on the surface of the conductive agent to promote formation of the agglomerated particles. This causes a shortage of the binder in the vicinity of the positive electrode active material particles to hinder smooth permeation of the electrolyte to be ensured by the presence of the binder, so that electrode reactions are hampered, resulting in lowered discharge characteristics. Also, with the formation of the agglomerated particles, because of the shortage of the binding effects of the binder, there arises another problem that the positive electrode material layer separates from the positive electrode core member.

On the other hand, when an excessive amount of binder is added in order to ensure that the electrode sheet is bound firmly, it is difficult to heighten the battery capacity. That is, an addition of a large amount of conductive agent and binder to the positive electrode, in consideration of the agglomeration of the conductive agent, makes the active material density low. The expression "active material density" as used herein refers to the density of the active material (g/ml) obtained by dividing the weight of the positive electrode active material contained in the positive electrode material layer by the volume of the positive electrode material layer. Resultantly, it becomes difficult to realize a non-aqueous electrolyte secondary battery having a higher capacity.

The present invention aims to provide a non-aqueous electrolyte secondary battery having a high capacity and excellent characteristics in terms of charge/discharge and cycle life. The present invention improves the way the conductive agent and binder are used and controls the amounts of the conductive agent and binder to attain high active material density of the positive electrode.

BRIEF SUMMARY OF THE INVENTION

An object of the present invention is to realize a non-aqueous electrolyte secondary battery comprising a lithium-containing transition metal oxide as a positive electrode active material which has both a high capacity and improved characteristics. Specifically, the present invention uses two kinds of binders having a different affinity for a non-aqueous electrolyte used in production of the battery in different steps and thereby enables a reduction in amount of a conductive agent and the binders, which has conventionally been difficult to achieve. As a result, the present invention can improve the active material density of a positive electrode without impairing characteristics in terms of charge/discharge and cycle life.

Another object of the present invention is to control, in a preferable range, the bulk density of the conductive agent contained in the positive electrode material paste and thereby form an excellent electroconductive network within the positive electrode material layer. The use of such a positive electrode makes it possible to provide a non-aqueous electrolyte secondary battery having excellent characteristics in terms of charge/discharge and cycle life.

Specifically, the present invention is directed to a method for producing a non-aqueous electrolyte secondary battery comprising the steps of: (i) mixing a positive electrode active material, a first binder A and a dispersion medium to prepare a paste A, the active material comprising a lithium-containing transition metal oxide; (ii) mixing a conductive agent, a second binder B and a dispersion medium to prepare a paste B, the conductive agent comprising carbon black; (iii) mixing the paste A and the paste B to prepare a positive electrode material paste C; (iv) applying the positive electrode material paste C onto a positive electrode core member and rolling and drying the resultant member to prepare a positive electrode; and (v) fabricating a battery using the positive electrode, a negative electrode and a non-aqueous electrolyte, wherein contact angle $\theta_A$ between the non-aqueous electrolyte and the binder A and contact angle $\theta_B$ between the non-aqueous electrolyte and the binder B satisfy the formula (1): $\theta_B - \theta_A \geq 15°$.

It is preferable that the contact angle $\theta_A$ satisfy $10° \leq \theta_A \leq 30°$ and that the contact angle $\theta_B$ satisfy $40° \leq \theta_B \leq 60°$.

The non-aqueous electrolyte preferably comprises a non-aqueous solvent dissolving a lithium salt.

The binder A is preferably at least one selected from the group consisting of polyvinylidene fluoride, modified polyvinylidene fluoride and polytetrafluoroethylene.

The positive electrode material paste C preferably comprises a particulate binder comprising a cross-linked polymer.

The amount of the conductive agent contained in the positive electrode material paste C is preferably not less than 1 part by weight and not more than 3 parts by weight per 100 parts by weight of the positive electrode active material.

The total amount of the binder A and the binder B contained in the positive electrode material paste C is preferably not less than 0.5 part by weight and not more than 2 parts by weight per 100 parts by weight of the positive electrode active material.

The positive electrode material paste C preferably comprises a particulate binder comprising a cross-linked polymer such that the total amount of the binder A, the binder B and the particulate binder becomes not less than 0.5 part by weight and not more than 2 parts by weight per 100 parts by weight of the positive electrode active material.

The present invention also encompasses a non-aqueous electrolyte secondary battery to be obtained by the above-described production method.

Specifically, the present invention relates to a non-aqueous electrolyte secondary battery comprising: a positive electrode comprising a positive electrode material layer and a positive electrode core member for supporting the positive electrode material layer, the positive electrode material layer being formed by applying, onto the core member, a paste comprising a positive electrode active material, a conductive agent, a first binder A and a second binder B and rolling and drying the resultant member, the positive electrode active material comprising a lithium-containing transition metal oxide, the conductive agent in the paste comprising carbon black and forming agglomerated particles having a bulk density of not less than 0.1 g/ml and not more than 0.5 g/ml; a negative electrode comprising a negative electrode material layer and a negative electrode core member for supporting the negative electrode material layer; and a non-aqueous electrolyte comprising a non-aqueous solvent dissolving a lithium salt.

It is preferable that the agglomerated particles have a particle size of less than 10 μm.

The present invention further relates to a non-aqueous electrolyte secondary battery comprising: a positive electrode comprising a positive electrode material layer and a positive electrode core member for supporting the positive electrode material layer, the positive electrode material layer comprising a positive electrode active material, a conductive agent, a first binder A and a second binder B, the positive electrode active material comprising a lithium-containing transition metal oxide, the conductive agent comprising carbon black; a negative electrode comprising a negative electrode material layer and a negative electrode core member for supporting the negative electrode material layer; and a non-aqueous electrolyte comprising a non-aqueous solvent dissolving a lithium salt, wherein the conductive agent contained in the positive electrode material layer forms agglomerated particles, and the agglomerated particles have a particle size of less than 10 μm.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

An exemplary method for producing a non-aqueous electrolyte secondary battery in accordance with the present invention will be detailed in the following.

Step (i)

In Step (i), a positive electrode active material, a first binder A and a dispersion medium are mixed to prepare a paste A.

As the positive electrode active material, it is preferable to use a lithium-containing transition metal oxide represented by the formula $LiMO_2$ (wherein M represents at least one selected from the group consisting of Co, Ni and Mn) or $Li[Li_xMn_{2-x}]O_4$ (wherein $0 \leq x \leq 0.18$).

As the binder A, it is preferable to use a fluorocarbon resin which is electrochemically stable in the charge/discharge range of the battery (3.0 to 4.3 V for a positive electrode, with respect to lithium).

Also, it is preferable that the contact angle $\theta_A$ between the non-aqueous electrolyte, which is a battery-constituting element, and the binder A satisfy $10° \leq \theta_A \leq 30°$. When the contact angle $\theta_A$ is too small, the affinity between the positive electrode and the non-aqueous electrolyte becomes too high, making the distribution of the non-aqueous electrolyte within the battery unbalanced. When the contact angle $\theta_A$ is too large, the affinity between the positive electrode and the non-aqueous electrolyte becomes too low, also making the distribution of the non-aqueous electrolyte within the battery unbalanced.

Specifically, it is preferable, as the binder A, to use polyvinylidene fluoride (PVDF), modified PVDF, other fluorocarbon resins comprising vinylidene fluoride units, polytetrafluoroethylene (PTFE) and the like. These may be used alone or in combination of two or more of them.

Examples of the modified PVDF include PVDF analogs comprising one or more units incorporated therein such as monochlorotrifluoroethylene, hexafluoropropylene or maleic acid unit.

As the dispersion medium of the paste A, N-methyl-2-pyrrolidone (NMP) is preferably used, but ketons such as acetone may also be used. Ketons are preferably mixed with NMP when used.

Step (ii)

In Step (ii), a conductive agent, a second binder B and a dispersion medium are mixed to prepare a paste B.

As the conductive agent, it is preferable to use carbon black.

Examples of the carbon black include acetylene black, furnace black and Ketjen black. Among them, acetylene black and furnace black are preferable.

With regard to the average particle size of the conductive agent, there is no particular limitation, but the average particle size of the primary particles is preferably 0.01 to 0.1 μm.

The bulk density of the conductive agent before it is contained in the paste B is preferably 0.02 to 0.05 g/ml. The bulk density of the conductive agent, however, generally becomes more than 0.5 g/ml and not more than 0.6 g/ml when it is contained in the paste B. This means that the dispersibility of the conductive agent is very high in the paste B.

The bulk density of the conductive agent that is contained in the paste B can be measured in the following manner.

First, the paste B is applied onto a substrate to form a film having a predetermined thickness. The film is dried, and the weight per volume (Wp) of the dried film is measured. Then, the weight of the binder B subtracted from Wp leaves the weight per volume of the conductive agent, i.e., the bulk density of the conductive agent. It is noted that the volume of the binder B is less than several percent of the volume of the conductive agent and that its effect on the evaluation of the bulk density of the conductive agent is therefore negligible. The bulk density of the conductive agent to be obtained in the above-described manner is not virtually dependent on the drying temperature and drying time of the film. The drying temperature may be set at about 80° C. and the drying time may be set for about one hour, for example.

As the binder B, any organic polymer may be used if it is electrochemically stable in the charge/discharge range of the battery (3.0 to 4.3 V for a positive electrode, with respect to lithium); however, contact angle $\theta_A$ between the non-aqueous electrolyte and the binder A and contact angle $\theta_B$ between the non-aqueous electrolyte and the binder B need to satisfy the formula (1): $\theta_B - \theta_A \geq 15°$.

The formula (1) indicates that the affinity between the binder A and the binder B is low. When $15° > \theta_B - \theta_A$, the affinity between the binder A and the binder B is not low any more, and it is impossible to obtain the effect of the present invention produced by preparing the paste A and the paste B separately.

Also, the contact angle $\theta_B$ preferably satisfies $40° \leq \theta_B \leq 60°$. When $\theta_B$ is too small, it becomes difficult to bring the non-aqueous electrolyte selectively in contact with the surface of the active material. When $\theta_B$ is too large, the affinity between the positive electrode and the non-aqueous electrolyte lowers remarkably.

Specifically as the binder B, (a) polyolefins having a side chain whose polarity is not so high such as hydrogenated nitrile rubber, (b) polyacrylonitrile, (c) polymers having acrylonitrile units and $-(CH_2)_n-$ portions wherein $6 \leq n$, (d) acrylic resins having a hydroxyl group, or the like are preferably used. These may be used alone or in combination of two or more.

NMP is preferably used also as the dispersion medium of the paste B, but ketones such as acetone may also be used. Ketons are preferably mixed with NMP when used.

Step (iii)

In step (iii), the paste A and the paste B are mixed to prepare a positive electrode material paste C.

As described above, the paste A and the paste B are separately prepared and thereafter mixed with each other for the following reasons.

In order to facilitate electrode reaction on the positive electrode, the affinity between the positive electrode active material and the non-aqueous electrolyte must be high. Thus, the surface of the positive electrode active material needs to be provided with the binder A having a high affinity for the non-aqueous electrolyte.

Meanwhile, carbon black, which is generally used as the conductive agent indispensable for formation of the electro-conductive network within the positive electrode, has a property to agglomerate while including a binder having a high affinity for the non-aqueous electrolyte.

Then, it is effective that the conductive agent is mixed with the binder B having a low affinity for the binder A, to prepare the paste B before preparing the positive electrode material paste. This suppresses agglomeration of the conductive agent caused by deposition of the binder A on the surface of the conductive agent, since the surface of the conductive agent dispersed in the paste B is provided with the binder B having a low affinity for the binder A beforehand. When the paste A is mixed with the paste B, the conductive agent dispersed in the paste B agglomerates, but only to the extent that the particle size of the agglomerated particles becomes less than 10 μm.

Also, when the paste A is mixed with the paste B, it is possible to control the bulk density of the agglomerated particles of the conductive agent contained in the desired paste C at not less than 0.1 g/ml and not more than 0.5 g/ml.

When the bulk density of the agglomerated particles is not less than 0.1 g/ml and not more than 0.5 g/ml, the contacting area of the active material and the conductive agent can be maintained large in the positive electrode. Also, when the bulk density is in this range, the positive electrode material layer needs to be pressurized relatively strongly in the production process of the positive electrode in order to cause the active material density of the positive electrode to reach a predetermined value (preferably 3.45 to 3.65 g/ml). The expression "active material density" as used herein also refers to the density of the active material (g/ml) obtained by dividing the weight of the positive electrode active material contained in the positive electrode material layer by the volume of the positive electrode material layer. This forms a firm electroconductive network and reduces the proportion of the active material particles isolated from the electroconductive network considerably, making it possible to form an excellent electroconductive network within the positive electrode.

When the bulk density of the agglomerated particles contained in the paste C is less than 0.1 g/ml, the conductive agent particles are too bulky (large in apparent volume), and the active material density of the positive electrode is lowered. When it exceeds 0.5 g/ml, on the other hand, it becomes difficult to form a superior electroconductive network within the positive electrode to the conventional network.

The bulk density of the conductive agent that is contained in the paste C can be measured by a method as described below similar to the method of measuring the bulk density of the conductive agent that is contained in the paste B.

First, the paste B is mixed with the binder A that is in an amount equal to the amount necessary for preparing the paste C. The resultant paste has the same composition as that of the paste C except for the absence of the active material. This paste is applied onto a substrate to form a film having a predetermined thickness. The bulk density of the conductive agent contained in the film is substantially equivalent to the bulk density of the conductive agent contained in the paste C. The film is dried, and the weight per volume (Wp) of the dried film is measured. Then, the weights of the binders A and B subtracted from Wp leave the weight per volume of the conductive agent, i.e., the bulk density of the conductive agent. It is noted that the volumes of the binders A and B are less than several percent of the volume of the conductive agent and that their effect on the evaluation of the bulk density of the conductive agent is therefore negligible. The bulk density of the conductive agent to be obtained in the above-described manner is not virtually dependent on the drying temperature and drying time of the film. The drying temperature may be set at about 80° C. and the drying time may be set for about one hour, for example.

As described above, in order to control the agglomeration of the conductive agent which is caused by the deposition of the binder A on the surface of the conductive agent when the paste A is mixed with the paste B, the contact angle $\theta_A$ and the contact angle $\theta_B$ must satisfy the formula (1): $\theta_B - \theta_A \geq 15°$.

The contact angle $\theta_A$ and the contact angle $\theta_B$ can be measured as follows. A solution prepared by dissolving the binder A or the binder B in a solvent such as NMP is applied onto a glass plate and dried to form a film. Upon dropping a predetermined non-aqueous electrolyte onto the film, the contact angle between the droplet and the film is measured by a microscope. The measurements of the contact angle are normally conducted at 25° C.

Although it is known that the contact angle is affected also by the shape of the solid surface, it is considered that the deposition of the binder within the positive electrode material layer takes place in the same manner as the deposition of the film prepared for measuring the contact angle takes place.

From the viewpoint of lowering the affinity between the binder A and the binder B, a difference of 15° or more between $\theta_A$ and $\theta_B$ may be sufficient. However, it is essential that $\theta_B$ be greater than $\theta_A$, since the affinity between the non-aqueous electrolyte and the surface of the active material needs to be higher than the affinity between the non-aqueous electrolyte and the surface of the conductive agent in view of the electrode reactions.

It is from the following two reasons that the non-aqueous electrolyte is used for measuring the contact angle.

First, it becomes possible to numerically express the affinity between the non-aqueous electrolyte and the surface of the active material or the conductive agent directly.

Second, both of the dispersion medium used for the preparation of the paste and the non-aqueous solvent contained in the non-aqueous electrolyte are polar solvents and are therefore similar in terms of surface free energy.

The second reason may be supported by the fact that the contact angle is about 14° when NMP is dropped on a PVDF film. This value is almost equivalent to the contact angle of about 15° formed when a common-composition non-aqueous electrolyte, prepared by dissolving lithium hexafluorophosphate ($LiPF_6$) in a mixture solvent of ethylene carbonate and diethyl carbonate, is dropped on a PVDF film.

The binder A and the binder B are soluble in the dispersion medium of the paste, but a particulate binder that is insoluble in the dispersion medium may also be used in combination with these binders. The particulate binder is preferably contained in the paste A in Step (i).

There is no particular limitation with regard to the particulate binder; however, the use of rubber particles containing no fluorine atom is preferable, and modified acrylic rubber fine particles comprising acrylonitrile units or the like may be used. As the modified acrylic rubber fine particles, for example, a copolymer comprising 2-ethylhexylacrylate units, acrylic acid units and acrylonitrile units is preferable. As a specific preferable example of the modified acrylic rubber fine particles, "BM500B" manufactured by Nippon Zeon Co., Ltd may be cited.

Since the particulate binder is capable of exhibiting its binding properties even in an extremely small amount, the use of the particulate binder enables a large reduction in amounts of the binders A and B and therefore makes a significant contribution to a positive electrode having a higher density, that is, a battery having a higher capacity.

There is no particular limitation with regard to the average particle size of the particulate binder, but it is preferably in a range from 0.05 to 0.5 μm. When the average particle size is less than 0.05 μm, the surface of the active material is too much coated with the particulate binder so that the battery reaction tends to be impeded. When it exceeds 0.5 μm, on the other hand, the distance between the active material particles becomes greater so that the electronic conductivity of the positive electrode is lowered.

The total amount of the binders contained in the positive electrode material paste C is preferably not less than 0.5 part by weight and not more than 2 parts by weight per 100 parts by weight of the active material. When the total amount of the binders is less than 0.5 part by weight, because of the shortage of the binders, the positive electrode material layer tends to separate from the core member after the positive electrode material paste C is applied onto the core member and dried, so that the production of the positive electrode becomes difficult. When the total amount of the binders exceeds 2 parts by weight, on the other hand, the electronic conductivity of the positive electrode is lowered, the life of the battery is shortened, and the increase in binder volume makes it difficult to heighten the battery capacity.

The weight ratio of the binder A to the binder B contained in the positive electrode material paste C is preferably 1:3 to 3:1. If the ratio is outside this range, it becomes difficult to control the agglomeration of the conductive agent in a preferable range.

The amount of the conductive agent contained in the positive electrode material paste C is preferably not less than 1 part by weight and not more than 3 parts by weight per 100 parts by weight of the active material. When the amount of the conductive agent is less than 1 part by weight, the electronic conductivity of the positive electrode is lowered, thereby shortening the battery life. When it exceeds 3 parts by weight, on the other hand, the increase in conductive agent volume makes it difficult to heighten the battery capacity.

Step (iv)

In Step (iv), the positive electrode material paste C is applied onto a positive electrode core member and dried, and the resultant member is rolled to form a positive electrode.

As the positive electrode core member, a metal foil such as an aluminum foil, a perforated plate (lath metal plate) or the like may be used. In view of the reduction in size and weight of the battery, it is common, as the core member, that the metal foil has a thickness of 10 to 25 μm and that the perforated plate has a thickness of 10 to 50 μm.

By applying the positive electrode material paste C onto both surfaces of the above-described core member and subjecting the resultant member to such processes as rolling and cutting, a positive electrode for a non-aqueous electrolyte secondary battery can be obtained. The thickness of the positive electrode is commonly 80 to 200 μm.

Step (v)

In Step (v), a battery is fabricated using the above-described positive electrode, a negative electrode and a non-aqueous electrolyte. This step may be performed conventionally.

For example, the negative electrode can be obtained by applying a negative electrode material paste comprising, as an active material, a carbonaceous material capable of absorbing/desorbing lithium ions onto both surfaces of a core member and subjecting the resultant member to such processes as rolling and cutting.

As the negative electrode core member, a metal foil such as a copper foil, a perforated plate (lath metal plate) or the like may be used. In view of the reduction in size and weight of the battery, it is common, as the core member, that the metal foil has a thickness of 8 to 20 μm and that the perforated plate has a thickness of 10 to 50 μm. The thickness of the negative electrode is commonly 80 to 200 μm.

The positive electrode and the negative electrode are wound, as appropriate, with a separator interposed therebetween, to produce an electrode assembly. When the electrodes and the separator are wound into a cylindrical shape, they form an electrode assembly for use in a cylindrical battery. When they are wound to have a substantially elliptic section, they form an electrode assembly for use in a rectangular battery.

The resultant electrode assembly is accommodated in a battery case having a predetermined shape.

As the separator, a micro-porous film made of a polyolefine such as polyethylene, polypropylene or the like is preferably used. The thickness of the separator is commonly 10 to 40 μm.

As the non-aqueous electrolyte, it is possible to use, without particular limitation, any non-aqueous electrolyte that is conventionally used for non-aqueous electrolyte secondary batteries, but a non-aqueous solvent dissolving a lithium salt is preferably used.

Examples of the lithium salt include lithium perchlorate, $LiPF_6$, $LiBF_4$, lithium trifluoromethylsulfonate, and lithium bistrifluoromethyl sulfonyl imide. These may be used alone or in combination of two or more of them.

Examples of the non-aqueous solvent include ethylene carbonate, propylene carbonate, butylene carbonate, ethylmethyl carbonate, dimethyl carbonate, diethyl carbonate, γ-butyrolactone, 1,2-dimethoxyethane, 1,2-dichloroethane, 1,3-dimethoxyethane, 4-methyl-2-pentanone, 1,4-dioxane, acetonitrile, propionitrile, butyronitrile, valeronitrile, benzonitrile, sulfolane, 3-methyl-sulfolane, tetrahydrofuran, 2-methyl-tetrahydrofuran, dimethylformamide, dimethylsulfoxide, trimethyl phosphate, and triethyl phosphate. These may be used alone or in combination of two or more of them.

The above-described non-aqueous electrolyte is injected into the battery case in which the electrode assembly is accommodated, and the battery case is then sealed to produce a non-aqueous electrolyte secondary battery in accordance with the present invention.

Figure 1:
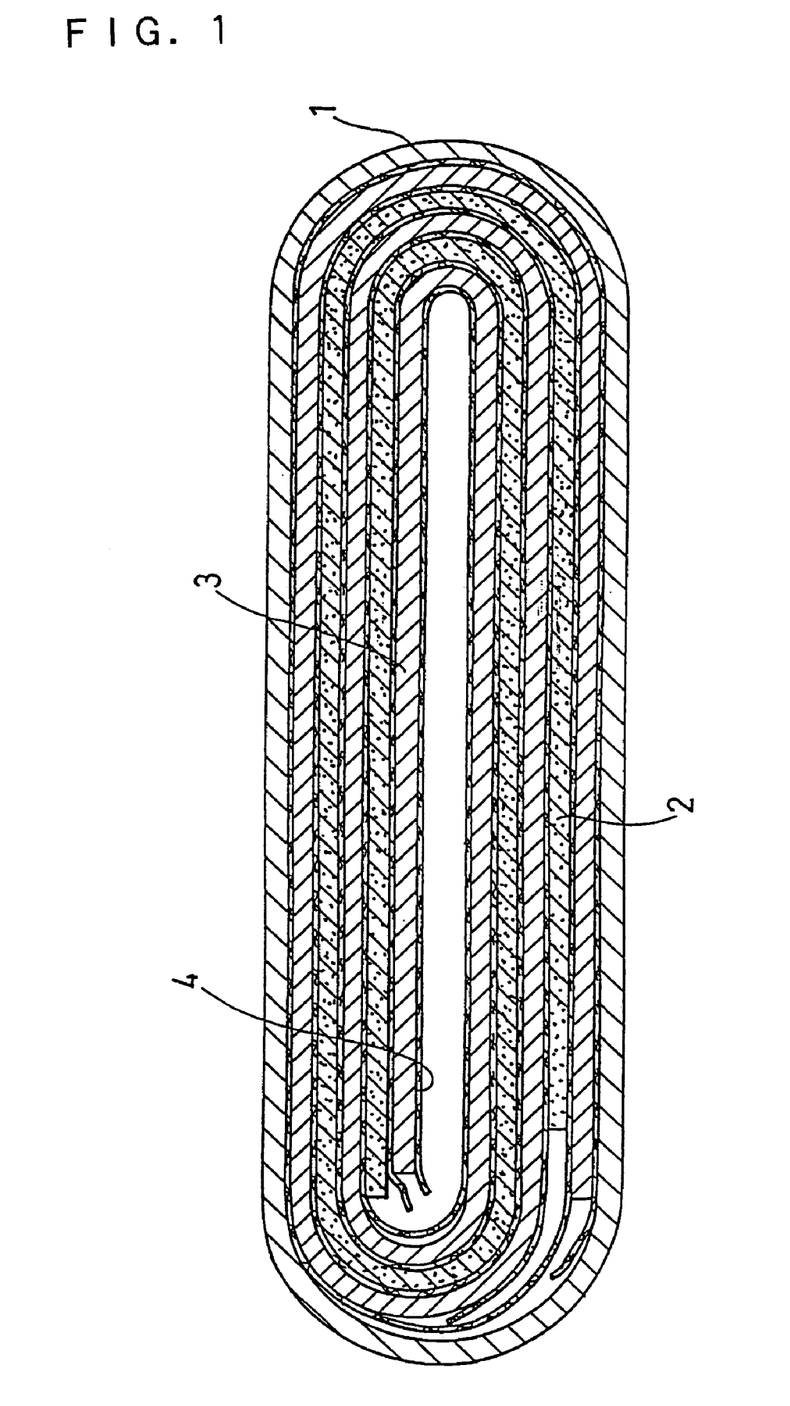
FIG. 1 is a transverse-sectional view illustrating an example of the non-aqueous electrolyte secondary battery in accordance with the present invention.

FIG. 1 is a transverse-sectional view of a flat-type rectangular battery which is an example of the non-aqueous electrolyte secondary battery in accordance with the present invention. Referring to FIG. 1, a rectangular battery case 1 accommodates a wound electrode assembly therein. The electrode assembly is formed by winding a positive electrode 2 and a negative electrode 3 with a separator 4 interposed therebetween such that the wound electrode assembly has a substantially elliptic section.

In the following, the present invention will be described specifically with reference to examples. These examples, however, are not to be construed as limiting, in any way, the present invention.

EXAMPLE 1

(i) Production of Positive Electrode

The followings were measured for producing a positive electrode:

Active material: $LiCoO_2$ (100 parts by weight)

Binder A: PVDF, which is a solid content of "KF polymer L #1320" manufactured by Kureha Chemical Industry Co., Ltd. (1 part by weight)

Binder B: hydrogenated nitrile rubber, which is a solid content of "BM-720H" manufactured by Nippon Zeon Co., Ltd. (0.5 part by weight)

Conductive agent: acetylene black having an average primary particle size of 0.03 μm (2 parts by weight)

<First Step>

$LiCoO_2$ and PVDF (binder A) were kneaded using NMP as a dispersion medium to prepare an active material paste A having a solid content of 85 wt %.

<Second Step>

Acetylene black and hydrogenated nitrile rubber (binder B) were kneaded using NMP as a dispersion medium to prepare a conductive agent paste B having a solid content of 22 wt %.

Figure 2:
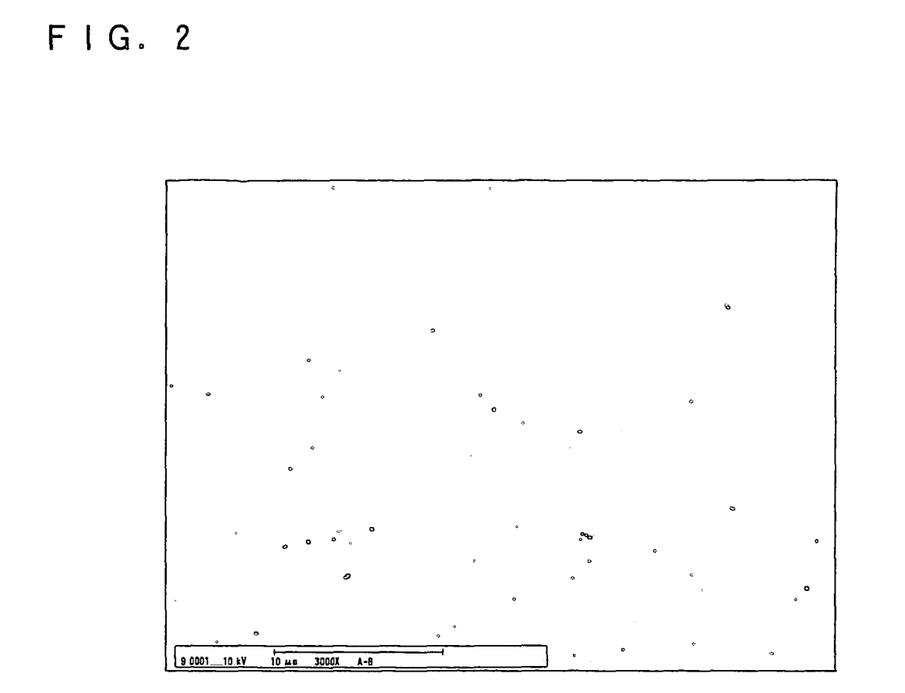
FIG. 2 is an SEM photo of the surface of a film of the paste B according to Example 1.

Part of the paste B was applied onto a glass plate to form a film having a thickness of 60 μm, and the film was dried at 80° C. for 1 hour. FIG. 2 is an SEM photo of the surface of the dried film. FIG. 2 shows that scaly pieces of acetylene black are densely laminated.

Thereafter, the weight per volume (Wp) of the dried film was measured, and it was 0.74 g/ml. Then, the weight of hydrogenated nitrile rubber (about 20 wt %) was subtracted from Wp, and the weight left, i.e., the bulk density per volume of the acetylene black was 0.59 g/ml. This indicates that the dispersibility of acetylene black is very high in the paste B.

<Third Step>

The active material paste A was mixed with the conductive agent paste B to prepare a positive electrode material paste C.

Separately, 50 parts by weight of PVDF (solid content of "KF polymer L #1320" manufactured by Kureha Chemical Industry Co., Ltd.) per 100 parts by weight of acetylene black was added to the conductive agent paste B, and the resultant paste was sufficiently kneaded to prepare a paste C' having the same composition as that of the paste C except for the absence of the active material.

Figure 3:
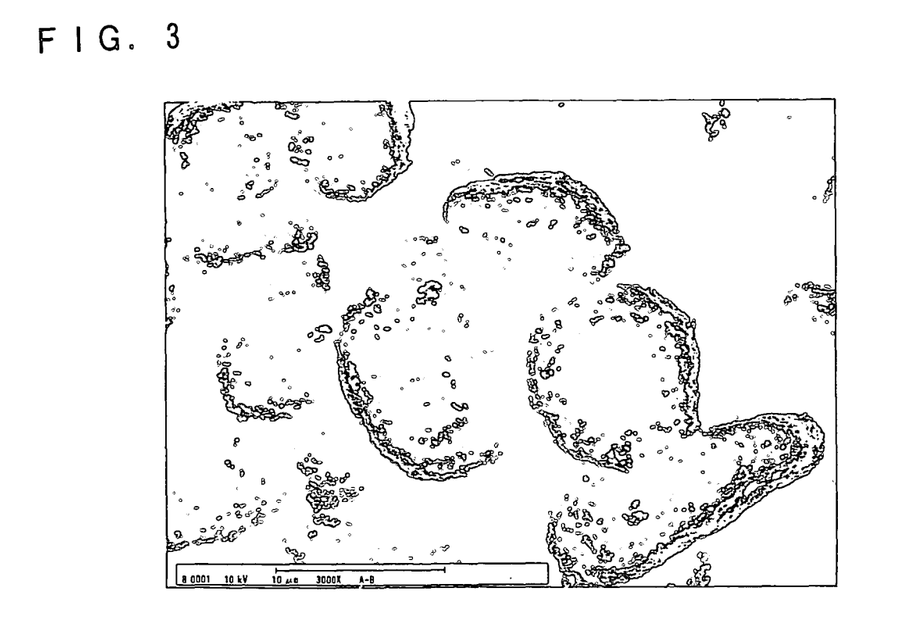
FIG. 3 is an SEM photo of the surface of a film of the paste C' according to Example 1.

Part of the paste C' was applied onto a glass plate to form a film having a thickness of 80 μm, and the film was dried at 80° C. for 1 hour. FIG. 3 is an SEM photo of the surface of the dried film. FIG. 3 shows that acetylene black agglomerates, in the form of a cocoon, to some extent.

Thereafter, the weight per volume (Wp) of the dried film was measured, and it was 0.46 g/ml. Then, the weights of hydrogenated nitrile rubber and PVDF (about 43 wt %) were subtracted from Wp, and the weight left, i.e., the bulk density per volume of the acetylene black was 0.26 g/ml. Thus, it can be concluded that the bulk density of acetylene black in the paste C is also around 0.26 g/ml. This indicates that the dispersion of acetylene black in the paste C is controlled in a preferable range.

Figure 4:
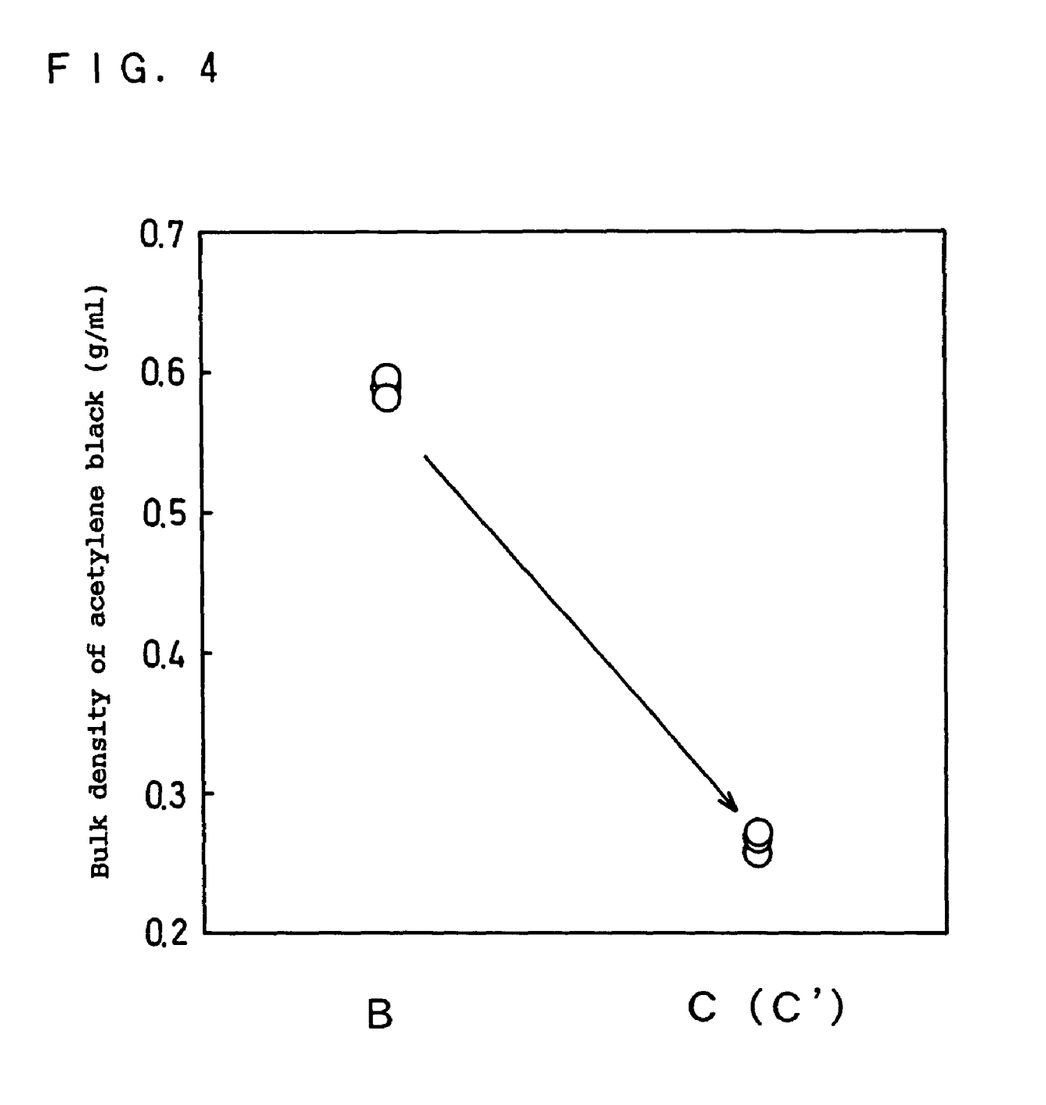
FIG. 4 is a graph showing the distribution of the bulk density of acetylene black contained in the paste B and paste C according to Example 1.

In the same manner as in the above, the bulk density of acetylene black in the paste B and the bulk density of acetylene black in the paste C were measured several times. FIG. 4 shows the distribution of the bulk density obtained. FIG. 4 indicates that the bulk density of acetylene black changes at a constant rate by the addition of PVDF.

Figure 5:
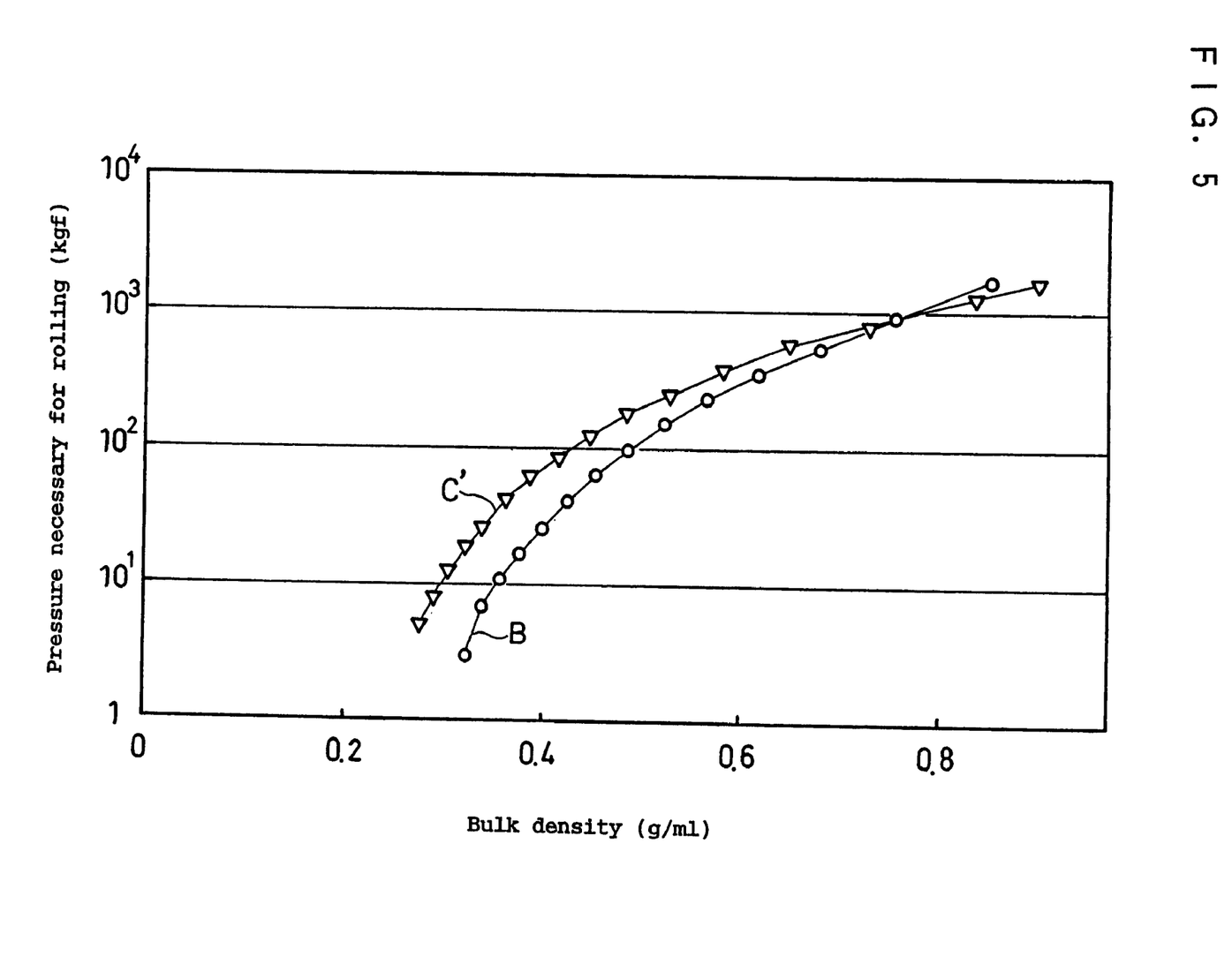
FIG. 5 is a graph showing the relationship between the pressure necessary for rolling the films of the paste B and paste C' according to Example 1 and the bulk density of acetylene black.

Separately, films were formed using the paste B and paste C' prepared in Example 1, and the films were rolled under varied pressures to examine the relationship between the bulk density of acetylene black and the pressure. FIG. 5 shows the results of the examination. FIG. 5 indicates that the paste C' requires a higher pressure than the paste B in order to achieve a predetermined bulk density. This has following meanings. In the case of the paste B not comprising PVDF, since acetylene black is highly dispersed therein, only a low pressure is required in rolling the film in order to achieve the predetermined bulk density. In the case of the paste C', however, since acetylene black particles are bulky (large in apparent volume) to a preferable extent due to agglomeration, a relatively high pressure is required in rolling the film in order to achieve the predetermined bulk density. Accordingly, if the paste C' contains the active material, application of a relatively high pressure would ensure that acetylene black particles are mixed and kept in intimate contact with the active material particles in rolling a film. The above-described mechanism is considered to allow formation of an excellent electroconductive network in Example 1.

<Fourth Step>

The positive electrode material paste C was applied onto both surfaces of an aluminum foil having a thickness of 20 μm and dried, and the resultant was rolled such that the porosity of the positive electrode material layer became 20%, and cut so as to have a width of 40 mm. This gave a positive electrode.

(ii) Production of Negative Electrode 100 parts by weight of artificial graphite powder was mixed with 3 parts by weight of styrene butadiene rubber as the binder, and the resultant mixture was suspended in an aqueous solution of carboxymethyl cellulose to prepare a paste. The paste was applied onto both surfaces of a copper foil having a thickness of 15 μm and dried, and the resultant was rolled, and cut into a predetermined size. This gave a negative electrode.

(iii) Fifth Step

The positive electrode and the negative electrode thus obtained were wound with a separator interposed therebetween in such a manner that the wound assembly, i.e., an electrode assembly, had a substantially elliptic section. A polyethylene micro-porous film having a thickness of 27 μm was used as the separator.

Meanwhile, $LiPF_6$ was dissolved in a mixture of equal volumes of ethylene carbonate and ethyl methyl carbonate at a concentration of 1 mol/L to prepare a non-aqueous electrolyte.

The electrode assembly was accommodated, with 2.8 g of the non-aqueous electrolyte, in a predetermined aluminum case with insulating rings placed on the top and bottom surfaces of the electrode assembly. Leads of the negative and positive electrodes were then connected to predetermined positions, respectively, and the opening of the case was sealed with a sealing plate, to produce a non-aqueous electrolyte secondary battery of the present invention.

The battery was a rectangle of 30 mm in width, 48 mm in height, and 5 mm in thickness and was designed to have a capacity as shown in Table 2.

EXAMPLES 2 TO 6

Positive electrodes and non-aqueous electrolyte secondary batteries were produced in the same manner as in Example 1 except that the amounts of the binders were varied as shown in Table 1.

EXAMPLE 7

A positive electrode and a non-aqueous electrolyte secondary battery were produced in the same manner as in Example 4 except for the addition of 0.3 part by weight of modified acrylic rubber fine particles per 100 parts by weight of the active material to the active material paste A in the first step. The modified acrylic rubber fine particles were insoluble in NMP and were solid content of "BM-500B" having an average particle size of 0.2 μm, manufactured by Nippon Zeon Co., Ltd.

EXAMPLE 8

A positive electrode and a non-aqueous electrolyte secondary battery were produced in the same manner as in Example 1 except for the use of modified PVDF (solid content of "KF polymer L #2619" manufactured by Kureha Chemical Industry Co., Ltd.) as the binder A to be used for the active material paste A.

COMPARATIVE EXAMPLE 1

A positive electrode and a non-aqueous electrolyte secondary battery were produced in the same manner as in Example 1 except for the use of saponified polyvinyl alcohol (solid content of "BM-700OH" manufactured by Nippon Zeon Co., Ltd.) in place of the hydrogenated nitrile rubber used for the conductive agent paste B.

COMPARATIVE EXAMPLE 2

A positive electrode and a non-aqueous electrolyte secondary battery were produced in the same manner as in Example 1 except for the use of modified polypropylene in place of the hydrogenated nitrile rubber used for the conductive agent paste B.

COMPARATIVE EXAMPLE 3

A positive electrode and a non-aqueous electrolyte secondary battery were produced in the same manner as in Example 1 except for the use of modified PVDF (solid content of "KF polymer L #2619" by Kureha Chemical Industry Co., Ltd.) as the binder A to be used for the active material paste A and the use of modified polypropylene in place of the hydrogenated nitrile rubber used for the conductive agent paste B.

EXAMPLES 9 TO 12

Positive electrodes and non-aqueous electrolyte secondary batteries were produced in the same manner as in Example 1 except that the amount of the conductive agent was varied as shown in Table 1.

COMPARATIVE EXAMPLE 4

A positive electrode and a non-aqueous electrolyte secondary battery were produced in the same manner as in Example 1 except that the positive electrode material paste was prepared by mixing and kneading the active material, binder A, binder B and conductive agent all together at one time.

COMPARATIVE EXAMPLE 5

A positive electrode and a non-aqueous electrolyte secondary battery were produced in the same manner as in Comparative Example 4 except that, without using the binder B, 4 parts by weight of PVDF (solid content of "KF polymer L #1320" manufactured by Kureha Chemical Industry Co., Ltd.) was used singly as the binder per 100 parts by weight of the active material and that 3 parts by weight of acetylene black was used as the conductive agent per 100 parts by weight of the active material.

EXAMPLES 13 TO 14

Positive electrodes and non-aqueous electrolyte secondary batteries were produced in the same manner as in Example 1 except that the weight ratios of the binders A and B were varied as shown in Table 1.

COMPARATIVE EXAMPLE 6

A positive electrode and a non-aqueous electrolyte secondary battery were produced in the same manner as in Example 7 except that PVDF was not added as the binder A to the active material paste A.

The materials used in the above-described examples and comparative examples and the positive electrodes and batteries obtained in the above manner were evaluated for the following points. The results are shown in Tables 1 and 2.

[Measurement of Contact Angle]

Each of the binders A or binders B was dissolved in the above-mentioned non-aqueous electrolyte used for producing the batteries, and the resultant solution was applied onto a glass plate and dried to form a film. Under an environment of 25° C., the same non-aqueous electrolyte was dropped on the film, and 15 seconds later, the contact angle between the droplet and the film was measured by a microscope.

[Bulk Density of Acetylene Black]

In the same manner as the method described in Example 1, the bulk density of acetylene black in each of the positive electrode material pastes C was measured.

[Visual Examination of Electrode]

Each of the positive electrode material pastes C was applied onto an aluminum foil and dried. Thereafter, the resultant positive electrode material layer was visually inspected for the presence or absence of separation from the foil. When a defect was found in the positive electrode, battery production was stopped.

[Discharge Characteristics]

Each of the resultant non-aqueous electrolyte secondary batteries was charged at 600 mA until the battery voltage became 4.2 V, and was then discharged at 120 mA or 1200 mA until the battery voltage became 3 V. The ratio of the discharge capacity at 1200 mA to that at 120 mA was expressed as a percentage.

[Cycle Life Characteristics]

Each of the resultant non-aqueous electrolyte secondary batteries was subjected to 200 cycles of charging at 600 mA up to 4.2 V and discharging at 600 mA down to 3 V. The ratio of the discharge capacity at the 200th cycle to that at the 1st cycle was expressed as a percentage.

TABLE 1

| Battery No. | Binder A | | | Binder B | | | $\theta_B - \theta_A$ (°) | Particulate binder | | Acetylene black |
| --- | --- | --- | --- | --- | --- | --- | --- | --- | --- | --- |
| | Kind | Amount (part by weight) | $\theta_A$ (°) | Kind | Amount (part by weight) | $\theta_B$ (°) | | Kind | Amount (part by weight) | Amount (part by weight) |
| Example 1 | L#1320 | 1 | 15.2 | H—NR | 0.5 | 44.1 | 28.9 | — | — | 2 |
| Example 2 | L#1320 | 1 | 15.2 | H—NR | 1 | 44.1 | 28.9 | — | — | 2 |
| Example 3 | L#1320 | 0.5 | 15.2 | H—NR | 0.5 | 44.1 | 28.9 | — | — | 2 |
| Example 4 | L#1320 | 0.25 | 15.2 | H—NR | 0.25 | 44.1 | 28.9 | — | — | 2 |
| Example 5 | L#1320 | 0.24 | 15.2 | H—NR | 0.24 | 44.1 | 28.9 | — | — | 2 |
| Example 6 | L#1320 | 1.1 | 15.2 | H—NR | 1 | 44.1 | 28.9 | — | — | 2 |
| Example 7 | L#1320 | 0.25 | 15.2 | H—NR | 0.25 | 44.1 | 28.9 | BM500B | 0.3 | 2 |
| Example 8 | L#2619 | 1 | 28.6 | H—NR | 0.5 | 44.1 | 15.5 | — | — | 2 |
| Example 9 | L#1320 | 1 | 15.2 | H—NR | 0.5 | 44.1 | 28.9 | — | — | 1 |
| Example 10 | L#1320 | 1 | 15.2 | H—NR | 0.5 | 44.1 | 28.9 | — | — | 3 |
| Example 11 | L#1320 | 1 | 15.2 | H—NR | 0.5 | 44.1 | 28.9 | — | — | 0.9 |
| Example 12 | L#1320 | 1 | 15.2 | H—NR | 0.5 | 44.1 | 28.9 | — | — | 3.5 |
| Example 13 | L#1320 | 1.5 | 15.2 | H—NR | 0.5 | 44.1 | 28.9 | — | — | 2 |
| Example 14 | L#1320 | 0.5 | 15.2 | H—NR | 1.5 | 44.1 | 28.9 | — | — | 2 |
| Comparative Example 1 | L#1320 | 1 | 15.2 | s-PVA | 0.5 | 26.5 | 11.3 | — | — | 2 |
| Comparative Example 2 | L#1320 | 1 | 15.2 | m-PP | 0.5 | 18.1 | 2.9 | — | — | 2 |

TABLE 1-continued

| | Binder A | | | Binder B | | | | Particulate binder | | Acetylene black |
|---|---|---|---|---|---|---|---|---|---|---|
| Battery No. | Kind | Amount (part by weight) | $\theta_A$ (°) | Kind | Amount (part by weight) | $\theta_B$ (°) | $\theta_B - \theta_A$ (°) | Kind | Amount (part by weight) | Amount (part by weight) |
| Comparative Example 3 | L#2619 | 1 | 28.6 | m-PP | 0.5 | 18.1 | −10.5 | — | — | 2 |
| Comparative Example 4 | L#1320 | 1 | 15.2 | H—NR | 0.5 | 44.1 | 28.9 | — | — | 2 |
| Comparative Example 5 | L#1320 | 4 | 15.2 | — | — | — | — | — | — | 3 |
| Comparative Example 6 | — | — | — | H—NR | 0.25 | 44.1 | — | BM500B | 0.3 | 2 |

H—NR: hydrogenated nitrile rubber
s-PVA: saponified polyvinyl alcohol
m-PP: modified polypropylene

TABLE 2

| Battery No. | Design capacity (mAh) | Bulk density of acetylene black (g/ml) | Separation of positive electrode material layer | 1200 mA/120 mA capacity ratio (%) | 200th cycle/1st cycle capacity ratio (%) |
|---|---|---|---|---|---|
| Example 1 | 625 | 0.24 | No | 84.5 | 87.1 |
| Example 2 | 615 | 0.33 | No | 81.2 | 87.6 |
| Example 3 | 635 | 0.32 | No | 85.9 | 87.5 |
| Example 4 | 645 | 0.34 | Minor | 87.1 | 88.0 |
| Example 5 | 647 | 0.34 | Slight | 87.3 | 87.6 |
| Example 6 | 611 | 0.32 | No | 80.1 | 86.8 |
| Example 7 | 640 | 0.29 | No | 85.8 | 88.1 |
| Example 8 | 625 | 0.47 | Minor | 82.1 | 84.2 |
| Example 9 | 655 | 0.33 | No | 87.6 | 79.2 |
| Example 10 | 595 | 0.34 | Minor | 85.2 | 88.1 |
| Example 11 | 661 | 0.33 | No | 89.2 | 75.2 |
| Example 12 | 580 | 0.31 | Slight | 87.1 | 89.3 |
| Example 13 | 612 | 0.11 | No | 80.9 | 86.9 |
| Example 14 | 625 | 0.50 | No | 81.8 | 74.1 |
| Comparative Example 1 | 625 | 0.08 | Slight | 79.7 | 82.2 |
| Comparative Example 2 | 625 | 0.07 | Slight | 74.2 | 79.6 |
| Comparative Example 3 | 625 | 0.08 | Slight | 79.8 | 82.4 |
| Comparative Example 4 | 625 | 0.06 | Slight | 77.7 | 83.3 |
| Comparative Example 5 | 565 | 0.03 | No | 77.2 | 88.3 |
| Comparative Example 6 | 645 | 0.55 | No | 86.1 | 65.0 |

First, the differences between Example 1 and Comparative Example 5 which is a conventional example will be described.

Comparative Example 5 was comparable to Example 1 in terms of both visual examination of the electrode and battery characteristics. However, in Comparative Example 5 requiring the use of a large amount of the binder and conductive agent, when the porosity of the positive electrode material layer was adjusted to around 20%, the design capacity became lower by about 10% than that of Example 1. Thus, in order to heighten the battery capacity, it was found to be indispensable to adopt such a positive electrode comprising reduced amounts of the binder and conductive agent as that of Example 1.

Next, the differences between Example 1, in which the positive electrode material paste C was prepared after the active material and the conductive agent were dispersed with a different binder in different pastes, respectively, and Comparative Example 4, in which the positive electrode material paste was prepared by mixing and kneading the active material, binder A, binder B and conductive agent all together at one time, will be described.

The discharge characteristics of the battery of Comparative Example 4 were lower than those of Example 1. The reason may be as follows. In Example 1, the surface of the conductive agent, i.e., acetylene black is covered with the binder B having a low affinity for PVDF beforehand, whereas in Comparative Example 4, acetylene black is able to come in contact with both the binders A and B and therefore forms large agglomerated particles including PVDF. In a battery comprising such a positive electrode as that of Comparative Example 4, there seems to arise an imbalance that the non-aqueous electrolyte is concentrated onto the agglomerated particles because of the presence of PVDF and is therefore depleted around the positive electrode active material particles.

Figure 6A:
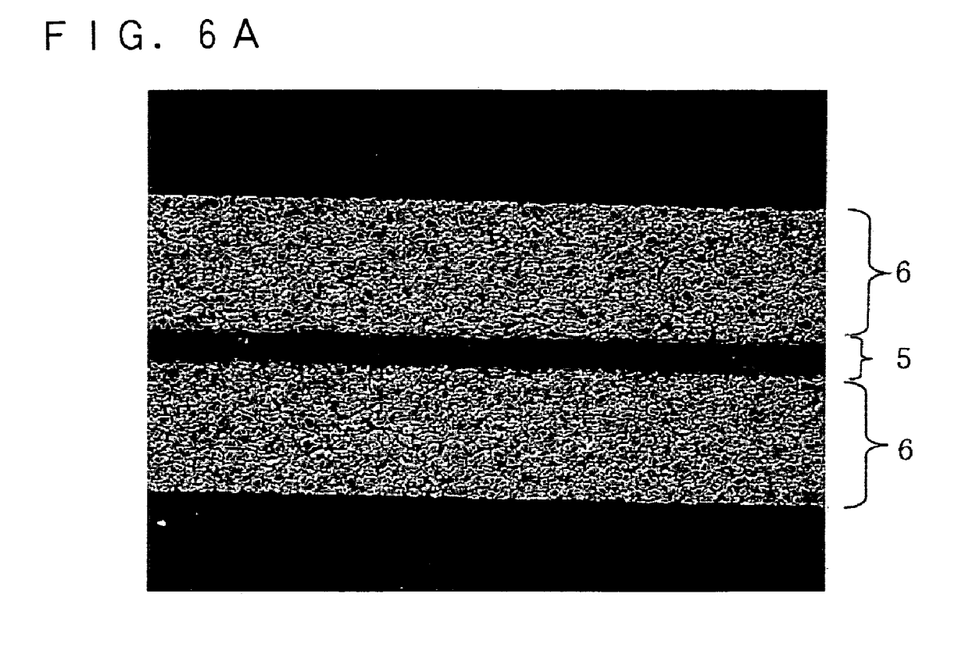
FIG. 6A is an enlarged photo of a section of a positive electrode according to Example 1.
Figure 6B:
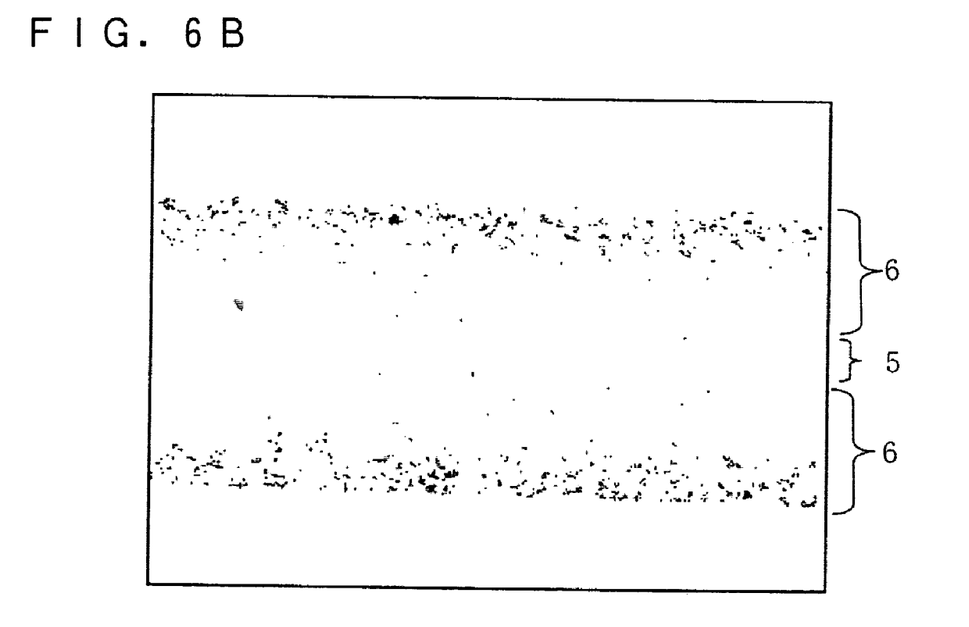
FIG. 6B is an illustration showing the distribution of fluorine atom in the section of FIG. 6A.

A section of the positive electrode of Example 1 was magnified 300 times by an EPMA for observation. FIG. 6A shows a photo of the section thus obtained, and FIG. 6B shows the distribution of fluorine atom in the section. In FIG. 6A, large agglomerated particles comprising acetylene black are hardly observed and no agglomerated particle having a particle size of not less than 10 μm is observed in the positive electrode material layers 6 formed on both surfaces of the aluminum foil 5. In FIG. 6B, no agglomeration of fluorine atom is observed either. This indicates that acetylene black is homogeneously dispersed in the positive electrode without forming large agglomerated particles including PVDF.

Figure 7A:
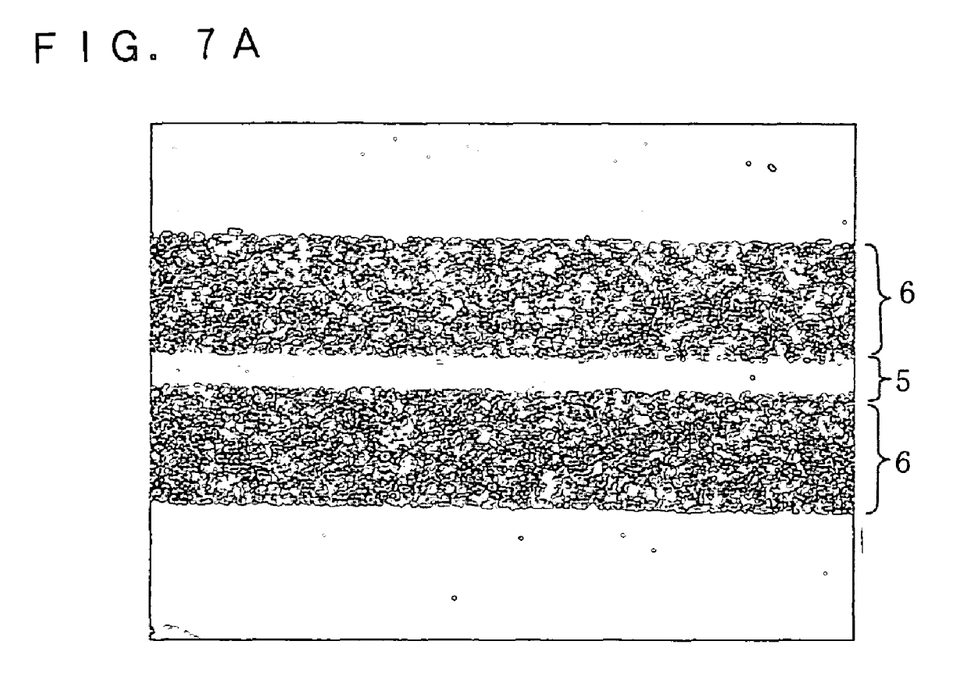
FIG. 7A is an enlarged photo of a section of a positive electrode according to Comparative Example 4.
Figure 7B:
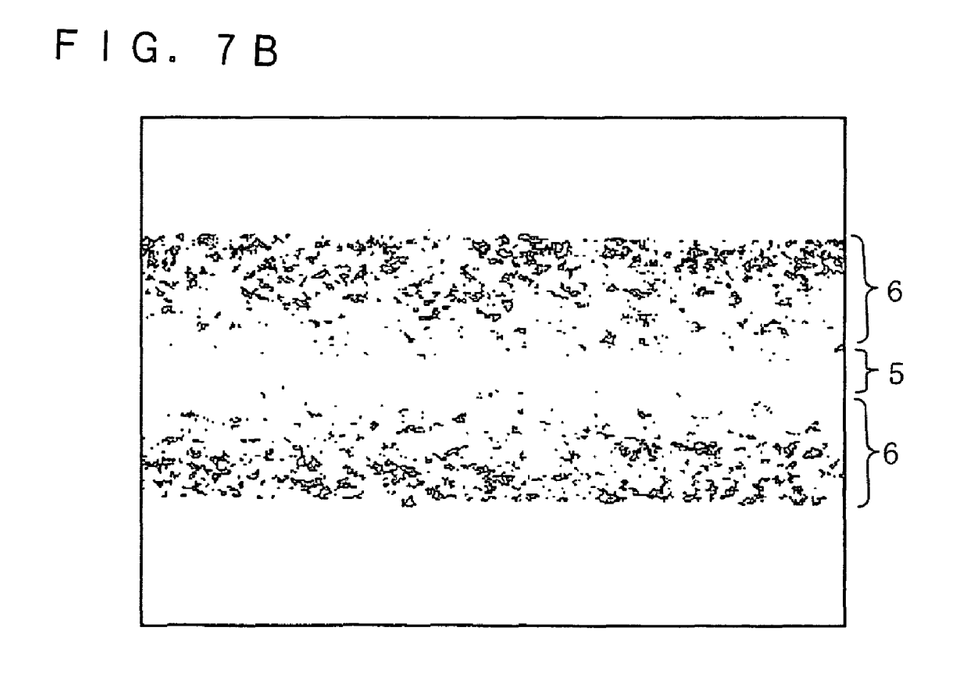
FIG. 7B is an illustration showing the distribution of fluorine atom in the section of FIG. 7A.

Meanwhile, a section of the positive electrode of Comparative Example 4 was magnified 300 times by an EPMA for observation. FIG. 7A shows a photo of the section thus obtained, and FIG. 7B shows the distribution of fluorine atom in the section. In FIG. 7A, a large number of agglomerated particles comprising acetylene black and having a particle size of not less than 10 μm are observed in the positive electrode material layers 6 formed on both surfaces of the aluminum foil 5. In FIG. 7B, considerable agglomeration of fluorine atom is observed.

Further, in Comparative Example 4, slight separation of the positive electrode material layer was observed, although no separation was observed in Example 1. This is presumably because the binder was unable to exhibit its binding properties due to consumption of PVDF by agglomeration of acetylene black. The above-discussed results confirm that the positive electrode material paste must be prepared in a procedure in accordance with the production method of the present invention.

The total amount of the binders will be detailed.

In Examples 1 to 4, there was almost no problem with regard to each of the evaluation points. In Example 5, however, slight separation of the positive electrode material layer was observed. This is presumably because the shortage of the total amount of the binders caused insufficient adhesion between the positive electrode material layer and the core member. In Example 6, both of the battery discharge characteristics and the life characteristics were slightly deteriorated as compared with Example 2. The reason may be as follows. Due to the excessive total amount of the binders, the surface of the positive electrode active material was excessively covered with the binders, and the charge/discharge reactions were therefore hindered. Further, when the total amount of the binders was increased while the porosity of the positive electrode material layer was adjusted to around 20% in consideration of the balance of the battery characteristics, the design capacity was lowered. That is, it became difficult to heighten the battery capacity. These findings confirm that the total amount of the binders are preferably not less than 0.5 part by weight and not more than 2 parts by weight per 100 parts by weight of the active material.

Example 7 indicates that the use of even an extremely small amount of the particulate binder that is insoluble in the dispersion medium is effective both in heightening the battery capacity and in suppressing the separation of the positive electrode material layer from the core member.

Selection of the binder will be described.

In Examples 1 and 8, there was almost no problem with regard to each of the evaluation points. In Comparative Examples 1 to 3, however, deterioration of battery discharge characteristics was observed. The reason may be as follows. In Comparative Examples 1 to 3, different binders from hydrogenated nitrile rubber were dispersed beforehand so as to cover the surface of the acetylene black; however, since the different binders had a high affinity for the binder A used for dispersion of the positive electrode active material, agglomeration similar to that of Comparative Example 4 took place during the preparation of the positive electrode material paste C. This confirms that the formula (1): $\theta_B - \theta_A \geq 15°$ needs to be satisfied with respect to the affinity between the binder A and the binder B.

The amount of the conductive agent will be explained.

In Examples 1, 9 and 10, there was almost no problem with regard to each of the evaluation points. In Example 11, however, the life characteristics were slightly deteriorated as compared with Example 9. This is presumably because, due to the shortage of the amount of the conductive agent in Example 11, formation of the electroconductive network in the positive electrode material layer indispensable for ensuring the life characteristics of the battery became insufficient. In Example 12, although the battery characteristics were favorable, the excessive amount of the conductive agent made the battery design for higher capacity difficult, thereby resulting in a 7% reduction in design capacity as compared with Example 1. Also in Example 12, the increase in amount of the conductive agent caused a relative decrease in amount of the binder and therefore impaired the adhesive properties of the electrode, so that separation of the positive electrode material layer was observed although slightly. These results confirm that the amount of the positive electrode conductive agent is preferably not less than 1 part by weight and not more than 3 parts by weight per 100 parts by weight of the active material.

The weight ratio of the binder A to the binder B will be described.

A comparison is made between Examples 13 and 14. In Example 13 in which the amount of the binder A is three times that of the binder B, the bulk density of acetylene black is as low as 0.11 g/ml. On the other hand, in Example 14 in which the amount of the binder B is three times that of the binder A, the bulk density of acetylene black is as high as 0.50 g/ml. These results indicate that the greater the amount of the binder A becomes relative to the binder B, the more the agglomeration of acetylene black proceeds, and the lower the bulk density becomes, while the smaller the amount of the binder A becomes relative to the binder B, the more unlikely the agglomeration of acetylene black takes place, and the higher the bulk density becomes.

Further, the results of the capacity retention ratio (200th cycle/1st cycle capacity ratio) suggest that the bulk density is preferably not so high. The reason may be as follows. In the case where acetylene black particles are not so bulky (not so large in apparent volume), they won't get mixed and come in intimate contact with the active material particles sufficiently when the positive electrode material layer is rolled in production of the positive electrode, so that a good electroconductive network is not formed in the positive electrode. Furthermore, the results of the high-rate discharge characteristics (1200 mA/120 mA capacity ratio) indicate that the bulk density is preferably not so low. The reason may be as follows. If acetylene black particles become too large in apparent volume due to the inclusion of the binder, the distribution of the electrolyte becomes uneven, thereby resulting in impaired discharge characteristics.

The state of the electroconductive network will be explained.

Figure 8:
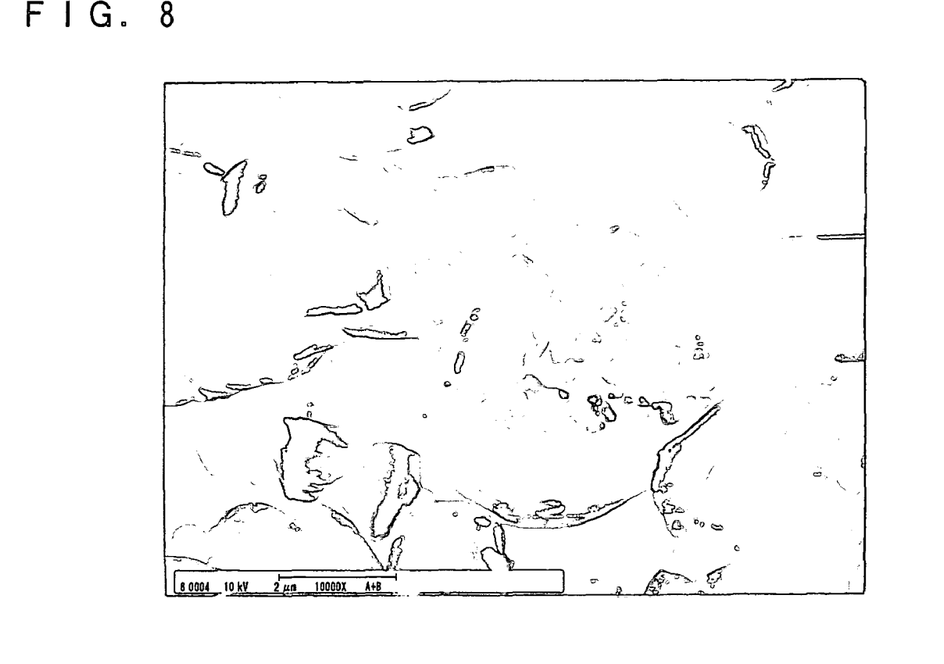
FIG. 8 is an SEM photo of the surface of a positive electrode material layer according to Comparative Example 6.
Figure 9:
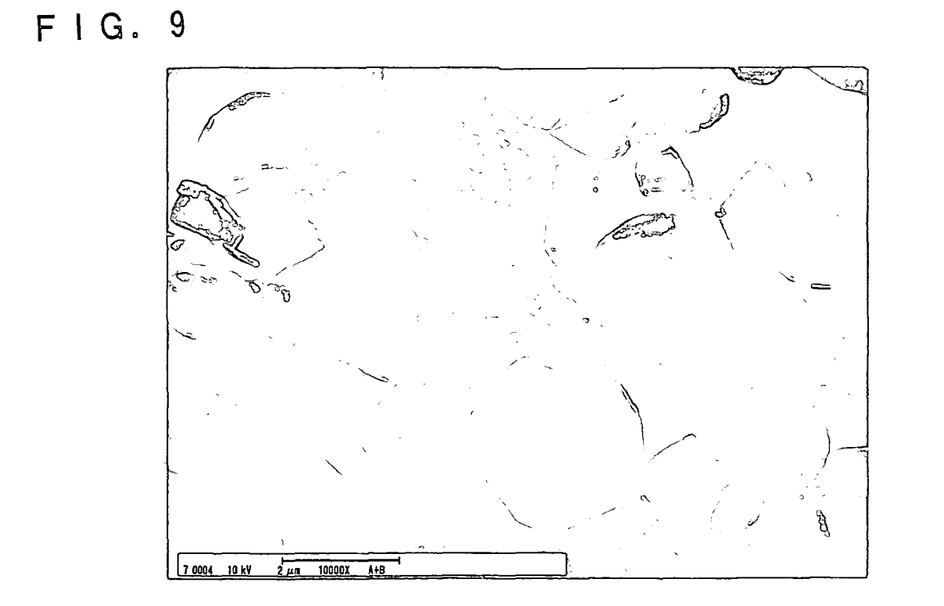
FIG. 9 is an SEM photo of the surface of a positive electrode material layer according to Example 7.

FIG. 8 is an SEM photo of the surface of the positive electrode material layer according to Comparative Example 6. FIG. 9 is an SEM photo of the surface of the positive electrode material layer according to Example 7. In these figures, groups of very fine particles in the form of salmon roe (clusters of very fine particles) are acetylene black, and large particles of indefinite shape are the active material.

FIG. 8 indicates that, in Comparative Example 6 of which capacity retention ratio was remarkably low, the positive electrode material layer has a large number of active material particles isolated from the acetylene black clusters which are small. On the other hand, FIG. 9 shows that, in Example 7 of which capacity retention ratio was favorable, the positive electrode material layer has almost no active material particle isolated from the acetylene black clusters which are relatively large.

These results reveal that the addition of the binder A to the positive electrode material paste is essential for controlling the bulk density of the conductive agent.

The batteries of Comparative Example 6 and Example 7 were subjected to repeated cycles of charge/discharge to examine the relationship between the discharge capacity and the discharge voltage.

At 20° C., the batteries were charged at a constant current of 780 mA until the battery voltage became 4.2 V and were then discharged at a constant current of 780 mA or 156 mA until the battery voltage became 3.0 V. This cycle was repeated 200 times.

Figure 10:
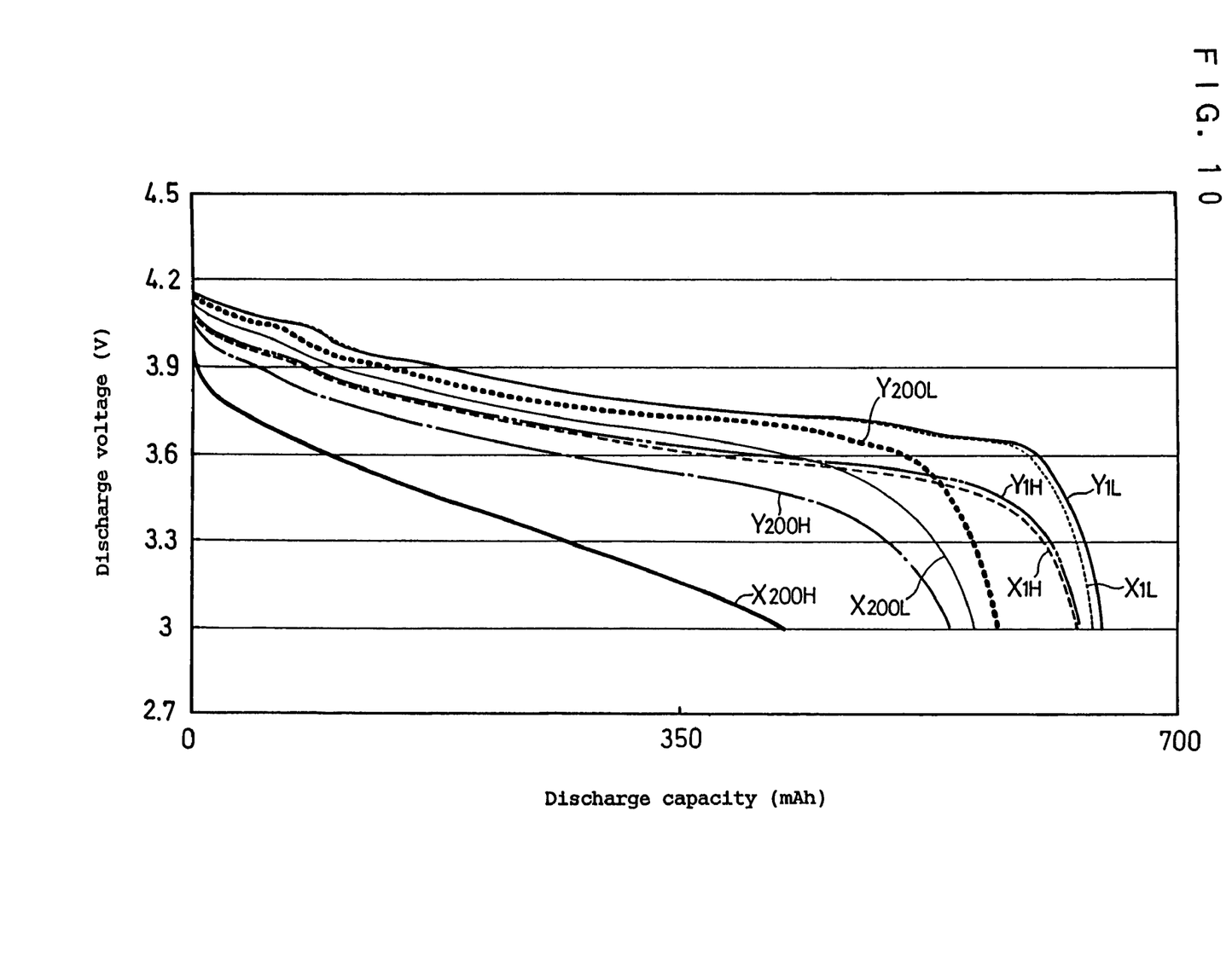
FIG. 10 is a graph showing the relationship between the discharge capacity and the discharge voltage in batteries according to Comparative Example 6 and Example 7.

FIG. 10 shows a discharge curve ($X_{1H}$) at 780 mA at the 1st cycle, a discharge curve ($X_{1L}$) at 156 mA at the 1st cycle, a discharge curve ($X_{200H}$) at 780 mA at the 200th cycle and a discharge curve ($X_{200L}$) at 156 mA at the 200th cycle, with regard to the battery according to Comparative Example 6.

FIG. 10 also shows a discharge curve ($Y_{1H}$) at 780 mA at the 1st cycle, a discharge curve ($Y_{1L}$) at 156 mA at the 1st cycle, a discharge curve ($Y_{200H}$) at 780 mA at the 200th cycle and a discharge curve ($Y_{200L}$) at 156 mA at the 200th cycle, with regard to the battery according to Example 7.

In FIG. 10, there is a large difference in characteristics, particularly in the discharge curves at 780 mA at the 200th cycle, between the batteries of Comparative Example 6 and Example 7. This indicates that the control of the bulk density of the conductive agent is a significant factor in improving the charge/discharge characteristics and cycle characteristics.

As described above, the present invention can provide a non-aqueous electrolyte secondary battery having a high capacity and favorable battery characteristics by preparing a positive electrode active material paste A and a conductive agent paste B using different binders having a low affinity for each other, respectively, and mixing the pastes.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for producing a non-aqueous electrolyte secondary battery comprising the steps of:
(i) mixing 100 parts by weight of a lithium-containing transition metal oxide, 0.24 to 1.5 parts by weight of a binder A comprising at least one selected from the group consisting of polyvinylidene fluoride, modified polyvinylidene fluoride, and polytetrafluoroethylene, and a dispersion medium to prepare a paste A;
(ii) preparing a paste B, independent of paste A, by mixing 0.9 to 3.5 parts by weight of carbon black, 0.24 to 1.5 parts by weight of a binder B comprising at least one selected from the group consisting of hydrogenated nitrile rubber, polyacrylonitrile, a polymer including an acrylonitrile unit and a —$(CH_2)_n$— structure (wherein 6<n), and an acrylic resin having a hydroxyl group, and a dispersion medium;
(iii) mixing said paste A and said paste B to prepare a positive electrode material paste C, wherein, agglomerated particles of the carbon black contained in the paste C have a bulk density of not less than 0.1 g/ml and not more than 0.5 g/ml;
(iv) applying said positive electrode material paste C onto a positive electrode core member and rolling and drying the resultant member to prepare a positive electrode; and
(v) fabricating a battery using said positive electrode, a negative electrode and a non-aqueous electrolyte,
wherein contact angle $\theta_A$ between said non-aqueous electrolyte and said binder A and contact angle $\theta_B$ between said non-aqueous electrolyte and said binder B satisfy the formula (1): $\theta_B - \theta_A \geq 15°$.

2. The method for producing a non-aqueous electrolyte secondary battery in accordance with claim 1, wherein said contact angle $\theta_A$ satisfies $10° \leq \theta_A \leq 30°$, and said contact angle $\theta_B$ satisfies $40° \leq \theta_B \leq 60°$.

3. The method for producing a non-aqueous electrolyte secondary battery in accordance with claim 1, wherein said non-aqueous electrolyte comprises a non-aqueous solvent dissolving a lithium salt.

4. The method for producing a non-aqueous electrolyte secondary battery in accordance with claim 1, wherein said positive electrode material paste C further comprises a particulate binder comprising a cross-linked polymer.

5. The method for producing a non-aqueous electrolyte secondary battery in accordance with claim 1, wherein the amount of said carbon black contained in said positive electrode material paste C is not less than 1 part by weight and not more than 3 parts by weight per 100 parts by weight of said positive electrode active material.

6. The method for producing a non-aqueous electrolyte secondary battery in accordance with claim 1, wherein the total amount of said binder A and said binder B contained in said positive electrode material paste C is not less than 0.5 part by weight and not more than 2 parts by weight per 100 parts by weight of said positive electrode active material.

7. The method for producing a non-aqueous electrolyte secondary battery in accordance with claim 1, wherein said positive electrode material paste C further comprises a particulate binder comprising a cross-linked polymer such that the total amount of said binder A, said binder B and said particulate binder becomes not less than 0.5 part by weight and not more than 2 parts by weight per 100 parts by weight of said positive electrode active material.

8. the method for producing a non-aqueous electrolyte secondary battery in accordance with claim 1, wherein the weight ratio of said binder A to said binder B contained in said positive electrode material paste C is 1:3 to 3:1.

* * * * *